Aug. 4, 1936.  W. STEPHENS  2,050,214
COMBINATION COMPOUND TUBE
Original Filed Aug. 12, 1931
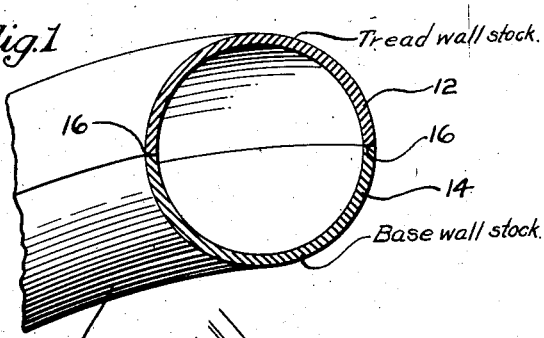
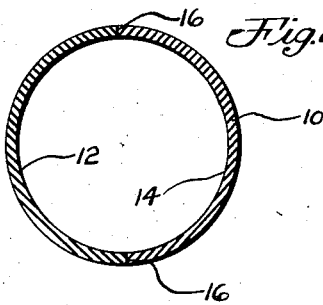
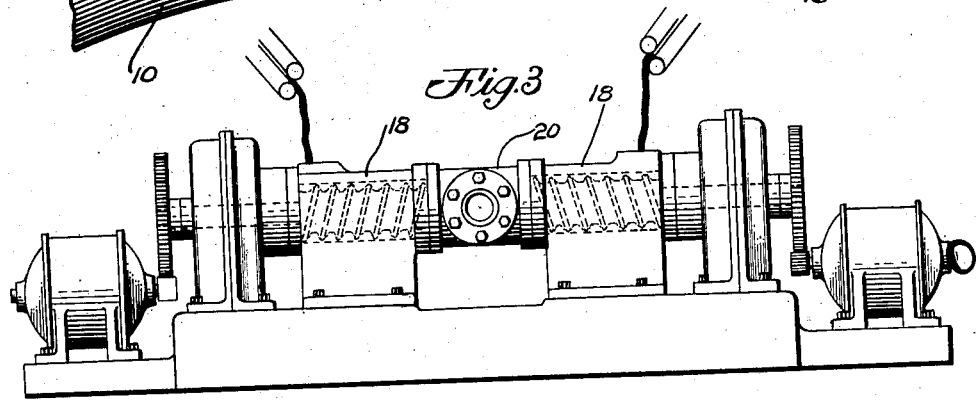
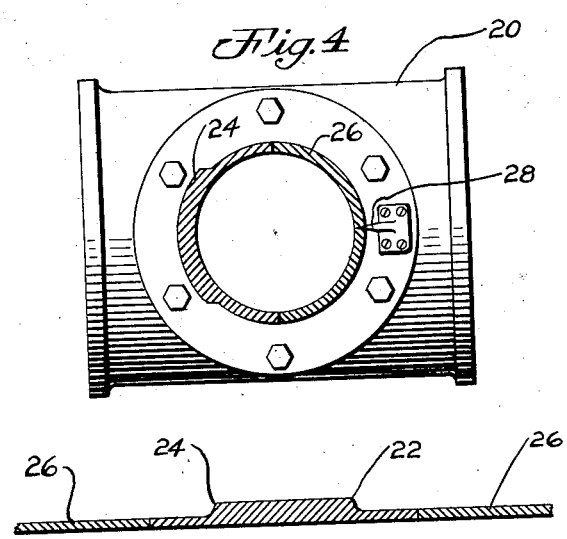
Inventor
William Stephens, Deceased.
Estelle Stephens, Executrix.
By
Attorney Patented Aug. 4, 1936

2,050,214

UNITED STATES PATENT OFFICE 2,050,214

COMBINATION COMPOUND TUBE

William Stephens, deceased, late of Akron, Ohio, by Estelle Stephens, executrix, Akron, Ohio; said Stephens, assignor, by mesne assignments, to Wingfoot Corporation, Wilmington, Del., a corporation of Delaware Original applications August 12, 1931, Serial No. 556,578, and January 10, 1933, Serial No. 651,006. Divided and this application October 23, 1934, Serial No. 749,585. In Canada August 12, 1931

3 Claims. (Cl. 18—14)

The invention relates to the manufacture of composite bodies of plastic material, and more particularly to the manufacture of rubber inner tubes and like rubber bodies which are built up of portions of different rubber compounds.

One object of the invention is to provide a method of making an inner tube for pneumatic tires which produces a body having portions of distinct compositions, which portions are particularly adapted for service and long wear in the position they assume in the tire and wheel assembly.

Another object of the invention resides in the provision of a method of rapidly, inexpensively and efficiently producing composite plastic bodies of the class described.

Another object of the invention is to provide a method for producing flat bodies of composite materials.

According to the present invention, rubber inner tubes are produced having an inner peripheral portion of a rubber compound which is of abrasive resisting nature, and an outer peripheral portion of a compound of high heat-resisting nature. In this manner the inner periphery of the tube can be of such compound that the tube can be used with drop-center rims or with rims without tire flaps, or under other similar conditions. At the same time the outer peripheral portion of the tube can be of a compound which is particularly adapted to be positioned directly behind the tread portions of the tire. The exact compositions of the respective compounds can, of course, be widely varied to meet any requirements.

The invention also includes the provision of a method of making composite bodies of the type described, which method is adapted to be performed by ordinary extrusion machinery. This object is accomplished by providing a plurality of cylinders for the extrusion of rubber compounds, each cylinder being designed to extrude a particular type of stock and then passing the materials emerging from these cylinders through a common die which is designed to unite the various strips into a single, composite tube or body.

The invention also contemplates employing the method herein described to make flat composite bodies, and in this respect it is particularly adapted to the making of a combination tread and sidewall unit or member for use on pneumatic tires. This is because the tread portion must be of a tough, long-wearing, comparatively expensive composition and the sidewalls may be of relatively cheaper materials, or of a compound particularly designed to withstand flexure rather than wear. In this manner the tread and sidewalls can be made of any respective compositions and yet be produced and handled in a single unit or piece of material.

This application is a division of prior applications of William Stephens, Serial No. 556,578, filed August 12, 1931, and Serial No. 651,006, filed January 10, 1933, the former of which having issued as Patent No. 1,952,470.

For a better understanding of the invention, reference may now be had to the accompanying drawing, forming a part of the specification, of which:

Fig. 1 is a perspective view of a cross-sectional portion of a vulcanized inner tube constructed in accordance with the invention;

Fig. 2 is a cross-sectional view taken through an unvulcanized length of inner tube formed in accordance with the invention;

Fig. 3 is an elevational view of an extruding machine employed in practicing the invention;

Fig. 4 is a fragmentary elevational view of a die head employed in the extrusion of a tread and sidewall unit; and Fig. 5 is a cross-sectional view of a tread and sidewall unit as produced by the die head of Fig. 4.

Referring to the drawing, the numeral 10 indicates an inner tube formed in accordance with the method embodying the invention, which tube comprises an outer peripheral portion 12 of a rubber compound marked "Tread wall stock" and an inner peripheral portion 14 formed of a rubber compound marked "Base wall stock". The walls 12 and 14 are preferably joined by butt joints 16 which define circumferentially extending lines. The "tread wall stock" 12, that is the stock forming the portion of the tube adjacent the tread of the tire has high heat-resisting characteristics, while the "base wall stock" forming the base or rim-contacting portion of the tube has high abrasive-resisting qualities. While the portions 12 and 14 have been particularly described as possessing certain characteristics, it will be understood that the exact characteristics of the respective compounds may be widely varied so that any desired qualities may be given to the respective portions.

In manufacturing composite tubes such as the tubes 10, a multi-cylinder extruding machine of the type illustrated in Fig. 3 may conveniently be employed. This machine may comprise a pair of aligned cylinders 18 containing suitably driven extruding means of the ordinary type, the cylinders 18 being connected with a common extruding head or die 20. The two materials are formed into curved sheets by suitable die passages in the head 20 and are then passed through a common circular opening where the edges of the sheets are united to form a tube. Co-pending applications, Serial Numbers 501,332 and 509,388, which are assigned to the same assignee as the present application, illustrate apparatus of this type.

In constructing the tube 10, the material comprising the one portion of the tube will be fed to one of the extruding cylinders while the material comprising the other portion of the tube will be fed to the other cylinder. The extruding cylinders or machines will then feed the respective materials to the common extruding die 20, through which they will be passed in the form of the unvulcanized tube indicated in Fig. 2. Thereafter the unvulcanized tube is cut into proper lengths and provided with valve stems, the ends of each length are joined, and the tubes are vulcanized in unitary molds, as will be understood. The handling of the tube after the tubing operation is thus very similar to the handling of the ordinary inner tube built by the extrusion method.

While the method described and illustrated embodies forming a tube in which the portions 12 and 14 each comprise substantially equal halves of the tube 10, it will be seen that by changing the form of the extruding head 20 that the portions 12 and 14 may be unequal, i. e., the one portion may extend a greater distance around the tube than the other. Moreover, it is not essential that the portions 12 and 14 be joined by butt joints 16, inasmuch as these joints may take the form of skived lap joints or the like.

Referring to the form of the invention illustrated in Fig. 5, the numeral 22 indicates a tread and sidewall unit comprising a tread portion 24 and sidewall portions 26. The tread portion 24 is of tough, long-wearing, comparatively inexpensive rubber. The sidewall portions 26 may be of somewhat cheaper rubber particularly adapted to resist flexing action.

In making the tread and sidewall unit 22, as illustrated in Fig. 5, the method followed is substantially the same as that described above in regard to making an inner tube, except that in this case the tuber head or die 20 is preferably provided with a knife 28 which is placed as shown in Fig. 5, so that as the material is extruded in the form of a tube, the knife 28 will cut the sidewall material along a longitudinal median line so that the tube may be then flattened into the shape shown in Fig. 5.

It will be understood that the respective compositions of the sidewall and tread material may be widely varied to meet any desired operating conditions or to provide any quality of tire desired. Moreover, the respective thicknesses of the tread portion and sidewalls are dependent upon the shape of the extruding head, which may be changed as desired. It will also be apparent that the tread portion 24 and the sidewall portions 26 may extend other than half way around the extruded tube, as explained above in regard to the inner tube, by merely changing the passages of the respective materials to the extruding die 20.

While the invention has been particularly described in regard to making inner tubes and tread and sidewall units, it will be evident that the principles thereof are broadly applicable, not only to forming composite rubber bodies but also to forming composite bodies of various other plastics.

It will also be understood that the invention contemplates not only forming the respective compounds of different characteristics but also forming the compounds of different colors so that very attractive products result.

Although there is illustrated and described only the preferred embodiment of the invention, it will be apparent to those skilled in the art that the invention is not so limited but that various modifications may be made therein without departing from the spirit of the invention or from the scope of the appended claims.

What is claimed is:

1. The method of making tread and sidewall units which comprises simultaneously feeding distinctive rubber compounds through individual passages to opposite sides of a common extruding die, extruding the respective compounds through the die in substantially half-tube shape, joining the longitudinal edges of the half tubes together and cutting the tube along a longitudinal line extending medially of one of the half tubes and flattening the body so formed.

2. The method of manufacturing tread and sidewall units for pneumatic tires which comprises providing tread and sidewall rubber stocks of distinct characteristics, forming the respective stocks into sheets and simultaneously joining the longitudinal edges of the sheet of one stock with the longitudinal edges of the sheet of other stock to form a tube and splitting the tube so formed along a line extending substantially medially of the sheet of sidewall stock and flattening the sheet thus formed.

3. The method of manufacturing composite flat bodies which comprises providing plastic stocks, forming the respective stocks into sheets and simultaneously joining the longitudinal edges of the sheet of one stock with the longitudinal edges of the sheet of other stock to form a tube, and cutting the tube so formed along a line and flattening the sheet so formed.

ESTELLE STEPHENS,
*Executrix of the Will of William Stephens, Deceased.*